(12) United States Patent
Matsumoto et al.

(10) Patent No.: US 8,207,464 B2
(45) Date of Patent: Jun. 26, 2012

(54) PORTABLE TERMINAL

(75) Inventors: Masaru Matsumoto, Osaka (JP); Kimiaki Imai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 281 days.

(21) Appl. No.: 12/594,129

(22) PCT Filed: Jun. 25, 2008

(86) PCT No.: PCT/JP2008/001650
§ 371 (c)(1),
(2), (4) Date: Sep. 30, 2009

(87) PCT Pub. No.: WO2009/016793
PCT Pub. Date: Feb. 5, 2009

(65) Prior Publication Data
US 2010/0044203 A1 Feb. 25, 2010

(30) Foreign Application Priority Data
Jul. 30, 2007 (JP) .................. 2007-197149

(51) Int. Cl.
*H01H 13/70* (2006.01)
(52) U.S. Cl. ........................................ 200/341; 200/5 A
(58) Field of Classification Search .......... 200/512–517, 200/310–317, 341; 341/22; 345/168–170; 455/575.1–575.8
See application file for complete search history.

(56) References Cited

U.S. PATENT DOCUMENTS

| | | | |
|---|---|---|---|
| 5,924,555 A * | 7/1999 | Sadamori et al. | 200/512 |
| 6,924,448 B2 * | 8/2005 | Sera et al. | 200/516 |
| 6,977,352 B2 * | 12/2005 | Oosawa | 200/314 |
| 7,119,296 B1 * | 10/2006 | Liu et al. | 200/341 |
| 7,423,229 B2 * | 9/2008 | Chen | 200/314 |
| 7,488,910 B2 * | 2/2009 | Hong | 200/310 |

(Continued)

FOREIGN PATENT DOCUMENTS
JP 11-329149 A 11/1999
(Continued)

*Primary Examiner* — Michael Friedhofer
(74) *Attorney, Agent, or Firm* — Birch, Stewart, Kolasch & Birch, LLP (57) ABSTRACT

In a portable terminal, a plurality of operation keys 7 are formed in a key through hole, which is formed in a housing main body that covers a printed board 15, by partitioning a stainless steel sheet 26 (a key sheet) by slits 26a. A urethane sheet 28 is attached to the rear side of the stainless steel sheet 26, where the urethane sheet 28 has ridge portions 28a that bulge out through the slits 26a to the front side of the stainless steel sheet 26, and the rear sides of the ridge portions 28a have groove-like openings. A rubber layer 29 is attached to the rear side of the urethane sheet 28, where the rubber layer 29 has a plurality of protruding portions 23 that protrudes toward a substrate 25 at positions corresponding to a plurality of fixed contacts 16 over the substrate 25. LEDs (light emitting means) and a light guide sheet 21 are disposed closer to the substrate than the rubber layer 29 is. Recess grooves 29a (wrong operation preventing means), for preventing the operation keys 7 located adjacent to each ridge portion 28a from being depressed at the same time, are formed in the rubber layer 29 at locations corresponding to the rear sides of the ridge portions 28a. This implements the operation keys 7 that have a nice feel and are less likely to cause wrong operation, while uniformly guiding light from the LEDs to the operation keys 7.

14 Claims, 6 Drawing Sheets

U.S. PATENT DOCUMENTS

| | | | |
|---|---|---|---|
| 7,605,338 B2 * | 10/2009 | Karaki et al. | 200/406 |
| 7,626,133 B2 * | 12/2009 | Wu et al. | 200/341 |
| 7,663,071 B2 * | 2/2010 | Chang | 200/345 |
| 7,718,910 B2 * | 5/2010 | Tatehata et al. | 200/314 |
| 7,737,375 B2 * | 6/2010 | Katori et al. | 200/5 A |
| 7,800,005 B2 * | 9/2010 | Tsao | 200/314 |
| 7,902,470 B2 * | 3/2011 | Hosaka | 200/314 |
| 2006/0243267 A1 | 11/2006 | Nakajima et al. | |
| 2007/0039809 A1 | 2/2007 | Aihara et al. | |

FOREIGN PATENT DOCUMENTS

| | | |
|---|---|---|
| JP | 2003-281965 A | 10/2003 |
| JP | 2006-66157 A | 3/2006 |
| JP | 2006-156333 A | 6/2006 |
| JP | 2007-087749 A | 4/2007 |
| JP | 2007-134071 A | 5/2007 |
| JP | 2007-234450 A | 9/2007 |
| WO | WO-2007/055048 A1 | 5/2007 |

* cited by examiner

PORTABLE TERMINAL

TECHNICAL FIELD

The present invention relates to portable terminals having operation keys that are visible even in the dark, such as mobile phones.

BACKGROUND ART

Conventionally, portable terminals, which have high usability while reducing the height of their operation keys, have been known in the field of portable terminals for which portability is of great importance.

For example, Japanese Published Patent Application No. H11-329149 describes a portable terminal having key switches that are operated by pressing the tops thereof, in which key base portions of the key switches are made of a resin film sheet having a uniform thickness.

Moreover, Japanese Published Patent Application No. 2003-281965 describes a portable terminal device having operation buttons, in which each operation button is formed by a key made of a resin, a stroke member made of an elastic material and provided immediately under the key, and a key switch having a contact that is depressed through the stroke member when the key is depressed, and an electrode on a substrate which is contacted by the contact.

Moreover, Japanese Published Patent Application No. 2006-66157 discloses a key input device structure of portable communication devices, in which a key sheet having a plurality of key buttons formed thereon, and a printed board are mounted in a housing having an upper case and a lower case, and openings are formed in the upper case so as to expose operation portions of the plurality of key buttons. In this key input device structure, restricting members for restricting positional displacement of the key sheet relative to the openings are formed so as to protrude from fixed locations near the key sheet toward the key sheet.

DISCLOSURE OF THE INVENTION

Problems to be Solved by the Invention

Incidentally, portable terminals, which illuminate operation keys in case the portable terminals are used in the dark, have been known recently. In such a case, a light guide sheet for guiding light of light emitting means to each operation key is used to illuminate all of the plurality of operation keys by a small number of light emitting means (e.g., LED (Light Emitting Diode) lamps). Since a material that tends to guide light is used for the light guide sheet, the light guide sheet has relatively high rigidity, and is less likely to be bent than resin film sheets and the like which are used in related art.

Thus, for example, if this light guide sheet is disposed on the inner surface side of the stroke members of Japanese Published Patent Application No. 2003-281965, the light guide sheet is less likely to be bent when the operation keys are pressed, thereby hindering smooth movement of the operation keys.

On the other hand, if openings are formed in the light guide sheet at the locations corresponding to the operation keys in order to solve this problem, too much light leaks from the opening portions, thereby causing light non-uniformity.

The present invention was developed in view of the above problems, and it is an object of the present invention to provide operation keys that have a nice feel and are less likely to cause wrong operation, while uniformly guiding light from light emitting means to the operation keys.

Means for Solving the Problems

In order to achieve the above object, wrong operation preventing means, for preventing adjacent operation keys from being depressed at the same time, is provided in the present invention.

More specifically, a portable terminal of a first invention includes: a substrate having a plurality of fixed contacts provided thereon; a housing main body covering the substrate from a front surface thereof, and having a key through hole; a key sheet forming a plurality of operation keys by partitioning the key through hole by slits; a urethane sheet attached to a rear surface of the key sheet, and having ridge portions that bulge out through the slits to a front side of the key sheet, where rear sides of the ridge portions have groove-like openings; a rubber layer attached to a rear surface of the urethane sheet, and having a plurality of protruding portions that protrude toward the substrate at positions corresponding to the plurality of fixed contacts; light emitting means disposed closer to the substrate than the rubber layer is, for emitting light; a light guide sheet disposed closer to the substrate than the rubber layer is, for receiving light from the light emitting means, and guiding the light to the key sheet; a plurality of conductive movable contacts disposed closer to the substrate than the light guide sheet is, so as to correspond to the plurality of fixed contacts; and pressing means that is pressed by the protruding portions to electrically connect the conductive movable contacts to the fixed contacts, when the keys are depressed. The rubber layer includes wrong operation preventing means disposed at locations corresponding to the rear sides of the ridge portions, for preventing the operation keys located adjacent to each ridge portion from being depressed at the same time.

With the above structure, since the light guide sheet receives light from the light emitting means to guide the light to the plurality of operation keys, the operation keys are easily operable even in the dark. In order to facilitate guiding of light, this light guide sheet has relatively high rigidity and is less likely to be bent. However, when each operation key is depressed, the wrong operation preventing means of the rubber layer reduces the influence of the depression on the operation keys located adjacent to the depressed operation key, thereby preventing wrong operation of the operation keys. Moreover, since the pressing means is pressed by the protruding portions of the rubber layer, and the pressing force is concentrated on the conductive movable contacts to electrically connect the conductive movable contacts to the fixed contacts, the usability of the operation keys is not reduced. Thus, no opening need to be formed in the light guide sheet at the locations corresponding to the operation keys, whereby non-uniformity of light is not caused by leakage of a large amount of light from the opening portions.

According to a second invention, in the first invention, the wrong operation preventing means is recess grooves formed on the rear sides of the ridge portions by recessing a rear side of the rubber layer.

With the above structure, the recess grooves are formed on the rear sides of the ridge portions. Thus, when one operation key is pressed, the opening portion of the corresponding recess groove is preferentially deformed, and the deformation is less likely to propagate toward the operation keys located adjacent to the pressed operation key.

According to a third invention, in the first invention, the wrong operation preventing means is openings formed along the ridge portions.

With the above structure, since deformation caused when pressing one operation key is blocked by the opening portion located on the lower surface of the corresponding ridge portion, the influence on the operation keys located adjacent to this operation key is reduced.

According to a fourth invention, in any one of the first through third inventions, the key sheet is made of a stainless steel sheet, and characters of the operation keys and the slits are cut out from the key sheet by a photoetching process.

With the above structure, since the photoetching process is a process based on chemical corrosion, this process is free from flashes, distortions, burrs, and the like, and high precision products can be produced even from a thin stainless steel sheet. Although the stainless steel sheet does not transmit light therethrough, the characters of the operation keys can be highlighted by, for example, leaking light from these cut-out characters.

According to a fifth invention, in the fourth invention, the urethane sheet is made of a translucent thermoplastic polyurethane resin capable of transmitting light guided by the light guide sheet, therethrough.

With the above structure, the thermoplastic polyurethane resin (TPU) is a kind of elastomer, and is characterized by being free from a vulcanization process, being easy to mold, providing a wide range of hardness and elasticity, being easy to color, and the like. The use of the translucent material enables the characters of the operation keys to be highlighted by the light guided by the light guide sheet.

According to a sixth invention, in the fifth invention, the urethane sheet is colored with a light-transmitting color or a non-light-transmitting color according to the characters and the slits.

With the above structure, portions to be highlighted can be arbitrarily selected by transmitting light as appropriate to highlight the characters and the slits, or by blocking light.

According to a seventh invention, in any one of the third through sixth inventions, the rubber layer is formed by pouring a translucent liquid rubber, capable of transmitting light guided by the light guide sheet, therethrough, into a mold, and then thermocompressing bonding the liquid rubber onto the rear side of the urethane sheet.

With the above structure, recess grooves and openings can be easily formed according to the ridge portions of the urethane sheet, and the use of the translucent material enables the characters of the operation keys to be highlighted by transmitting the light guided by the light guide sheet.

According to an eighth invention, in any one of the first through seventh inventions, the pressing means is formed by pressing sheets that are attached to a rear side of the light guide sheet at positions corresponding to the conductive movable contacts.

With the above structure, since the pressing sheets are attached to the rear side of the conductive sheet located on the surfaces of the conductive movable contacts, the pressing force generated when depressing the operation keys is concentrated on the pressing sheets, and the conductive movable contacts are reliably electrically connected to the fixed contacts. Especially, since the pressing sheets, having lower rigidity than that of the light guide sheet, are attached to the light guide sheet having high rigidity, the pressing sheets perform a cushion function, thereby providing an improved feel when pressing the operation keys 7.

According to a ninth invention, in the eighth invention, the light guide sheet is made of polycarbonate, and the pressing sheets are formed by applying an adhesive to a material having lower rigidity than that of polycarbonate.

With the above structure, since polycarbonate (PC) is highly transparent, polycarbonate tends to guide light from the light emitting means to each operation key. Moreover, by forming the pressing sheets from a material having lower rigidity than that of polycarbonate (e.g., polyethylene terephthalate), a soft feel can be provided when pressing the operation keys. Moreover, the pressing sheets can be easily attached to the light guide sheet by the adhesive.

According to a tenth invention, in any one of the first through ninth inventions, the pressing means is formed by pressing protrusions that are formed integrally on a rear side of the light guide sheet at positions corresponding to the conductive movable contacts.

With the above structure, by forming the pressing protrusions integrally on the rear side of the light guide sheet located on the surfaces of the conductive movable contacts, the pressing force generated when depressing the operation keys is concentrated on the pressing protrusions, whereby the conductive movable contacts are reliably electrically connected to the fixed contacts. Moreover, forming the pressing means integrally on the light guide sheet reduces the number of parts, and thus, the number of assembling steps.

According to an eleventh invention, in the tenth invention, the light guide sheet is made of polycarbonate, and the pressing protrusions are formed by curing an ultraviolet (UV)-curable resin.

With the above structure, since polycarbonate is highly transparent, polycarbonate tends to guide light from the light emitting means to each operation key. Moreover, since the pressing protrusions are formed integrally by applying UV light to the UV-curable resin, it is very easy to form the pressing protrusions. Moreover, by forming the pressing protrusions from a material having lower rigidity than that of polycarbonate, a soft feel can be provided when pressing the operation keys.

According to a twelfth invention, in any one of the eighth through eleventh inventions, the conductive movable contacts are attached to a rear side of a switch sheet, and contact openings are formed in the switch sheet at positions corresponding to central portions of the conductive movable contacts.

With the above structure, attaching the conductive movable contacts to the rear side of the switch sheet facilitates positioning between the conductive movable contacts and the fixed contacts. Moreover, forming the contact openings causes the pressing force of the pressing means to be easily applied to the central portions of the conductive movable contacts, whereby the operation keys provide an improved feel. Moreover, forming the contact openings reduces the height of the operation keys by the amount corresponding to the thickness of the switch sheet.

According to a thirteenth invention, in any one of the first through seventh inventions, the conductive movable contacts are attached to a rear side of a switch sheet, and the pressing means is formed by pressing protrusions that are formed integrally on a front side of the switch sheet at positions corresponding to the conductive movable contacts.

With the above structure, attaching the conductive movable contacts to the rear side of the switch sheet facilitates positioning between the conductive movable contacts and the fixed contacts. Moreover, by forming the pressing protrusions integrally on the front side of the switch sheet located on the surfaces of the conductive movable contacts, the number of parts, and thus, the number of assembling steps are reduced, and the pressing force generated when depressing the operation keys tends to be intensively transmitted from the protruding portions to the pressing protrusions, whereby the conductive movable contacts are reliably electrically connected to the fixed contacts.

According to a fourteenth invention, in the thirteenth invention, the light guide sheet is made of polycarbonate, and the switch sheet is made of polyethylene terephthalate.

With the above structure, since polycarbonate is highly transparent, polycarbonate tends to guide light from the light emitting means to each operation key. Moreover, since the switch sheet having the pressing protrusions are made of polyethylene terephthalate having lower rigidity than that of polycarbonate, a soft feel can be provided when pressing the operation keys. Moreover, in the case where polycarbonate is used, white sheets, which are advantageous for improved reflection efficiency, can be easily prepared.

According to a fifteenth invention, in any one of the first through fourteenth inventions, the portable terminal is a mobile phone.

With the above structure, a mobile phone is provided in which the operation keys are easily visible because light from the light emitting means is uniformly guided to the operation keys, and in which the operation keys provide a nice feel when being pressed, and are less likely to cause wrong operation.

Effects of the Invention

As described above, according to the present invention, wrong operation preventing means, for preventing operation keys located adjacent to each ridge portion from being depressed at the same time, is provided in the rubber layer at locations corresponding to the rear sides of the ridge portions. Thus, operation keys, which have a nice feel and are less likely to cause wrong operation, can be implemented while uniformly guiding light from light emitting means to the operation keys.

DESCRIPTION OF CHARACTERS 1 mobile phone (portable terminal)
3a front-side cabinet (housing main body)
7 operation key
11 key through hole
16 fixed contact
17 LED
18 switch sheet
19 contact opening
20 conductive movable contact
21 light guide sheet
23 protruding portion
24 pressing sheet
25 main substrate
26 stainless steel sheet
26a slit
28 urethane sheet
28a ridge portion
29 rubber layer
29a recess groove (wrong operation preventing means)
29b opening (wrong operation preventing means)
124 pressing protrusion (pressing means)
224 pressing protrusion (pressing means)

BEST MODE FOR CARRYING OUT THE INVENTION

An embodiment of the present invention will be described below with reference to the accompanying drawings.

Figure 1:
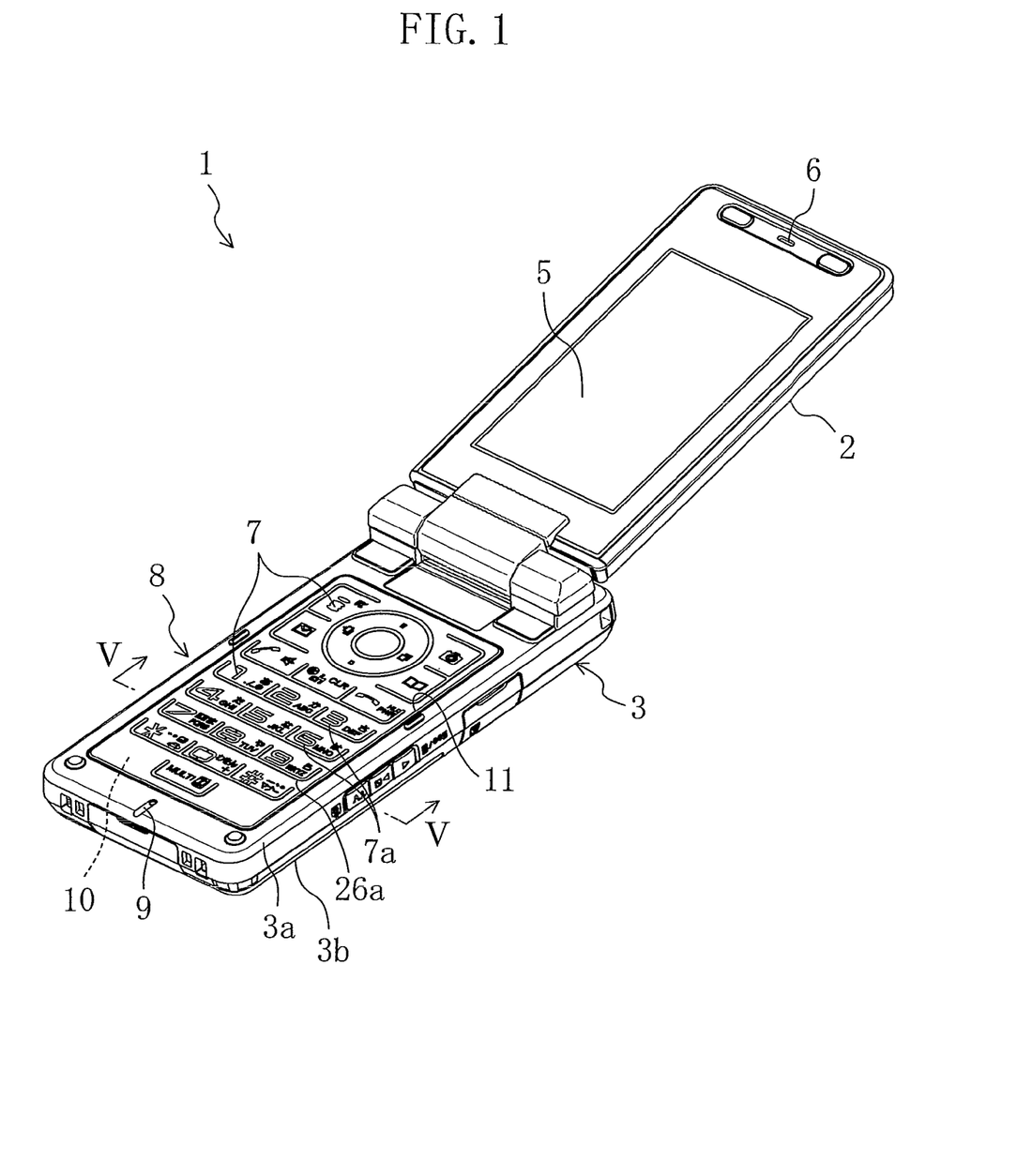
FIG. 1 is a perspective view showing a state where a first housing of a mobile phone according to an embodiment of the present invention is opened with respect to a second housing thereof.
Figure 2:
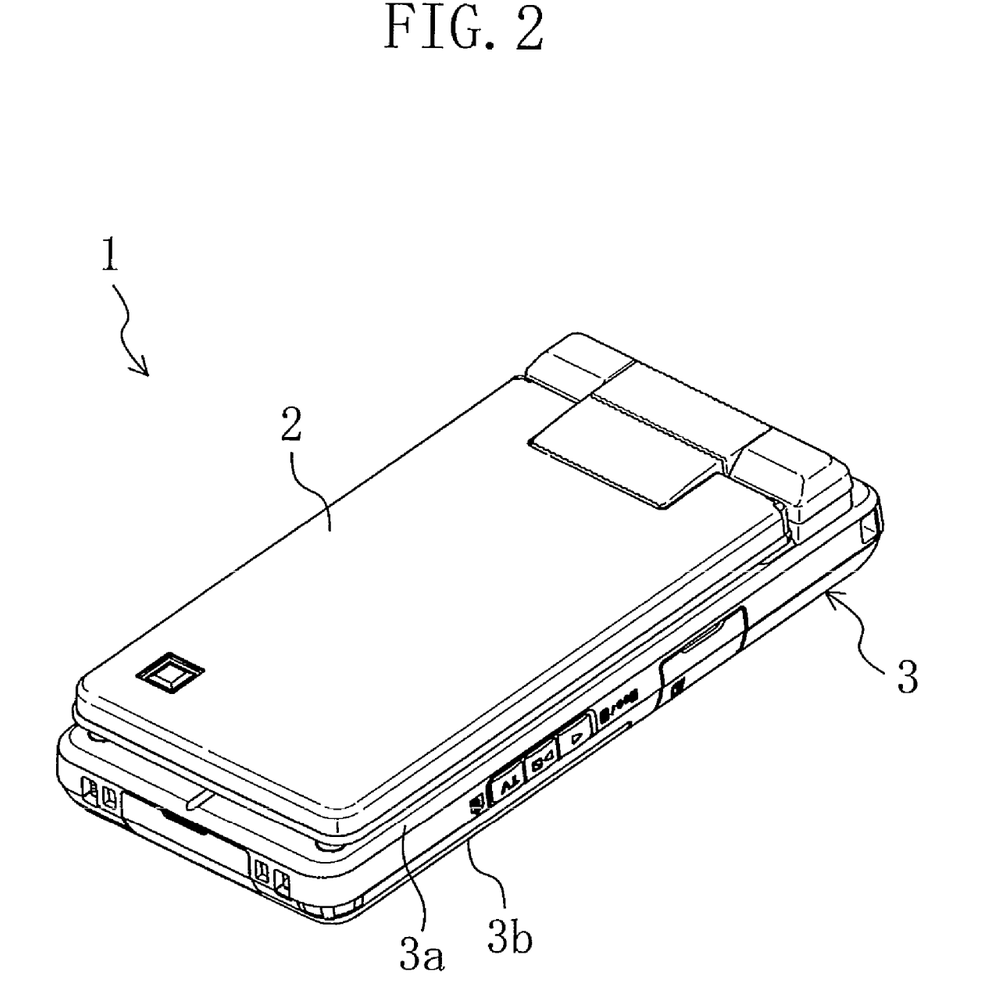
FIG. 2 is a perspective view showing a state where the first housing of the mobile phone is closed with respect to the second housing thereof.

FIG. 1 is a perspective view showing a state where a first housing of a mobile phone according to an embodiment of the present invention is opened with respect to a second housing thereof. FIG. 2 is a perspective view showing a state where the first housing of the mobile phone is closed with respect to the second housing thereof.

As shown in FIGS. 1 and 2, a mobile phone 1 includes a first housing 2 and a second housing 3, which are long in the vertical direction. The first housing 2 has an oblong display portion 5 on its surface, which is long in the vertical direction. A speech receiving portion 6 is provided above the display portion 5. The display portion 5 may be either a liquid crystal display or an organic EL (electroluminescence) display.

The second housing 3 has an operation portion 8 including a plurality of operation keys 7 for operating the mobile phone 1. A speech transmitting portion 9 is provided under the operation portion 8.

The second housing 3 includes a front-side cabinet 3a as a housing main body, and a rear-side cabinet 3b. A substrate unit 10 having the operation portion 8 is inserted between the front-side cabinet 3a and the rear-side cabinet 3b.

One key through hole 11 is formed in the front-side cabinet 3a. A plurality of operation keys 7, which are formed by function keys, and a plurality of operation keys 7, which are formed by number keys, are positioned in the key through hole 11. A character 7a is shown on each operation key 7.

Figure 3:
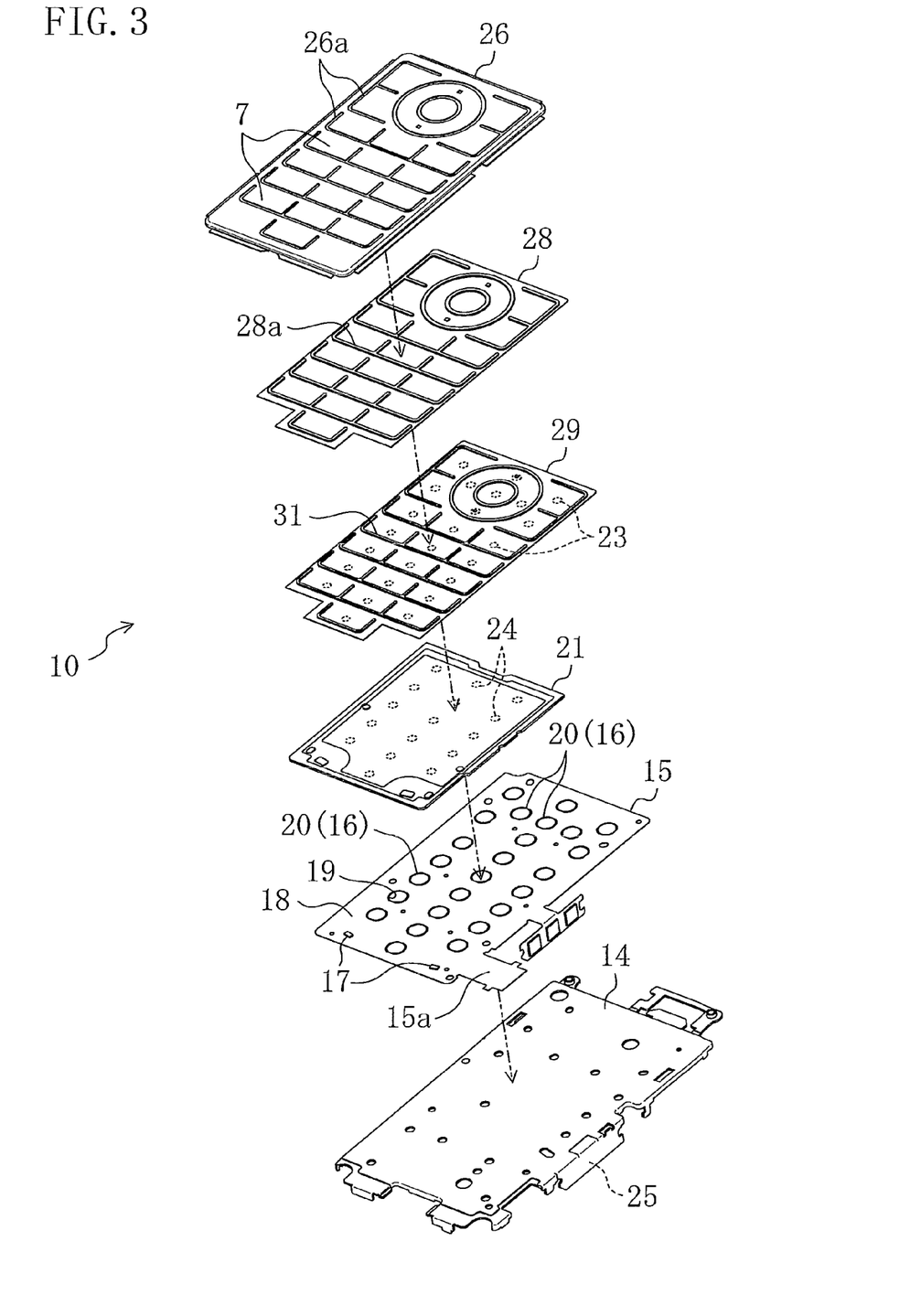
FIG. 3 is an exploded perspective view of a substrate unit.
Figure 4:
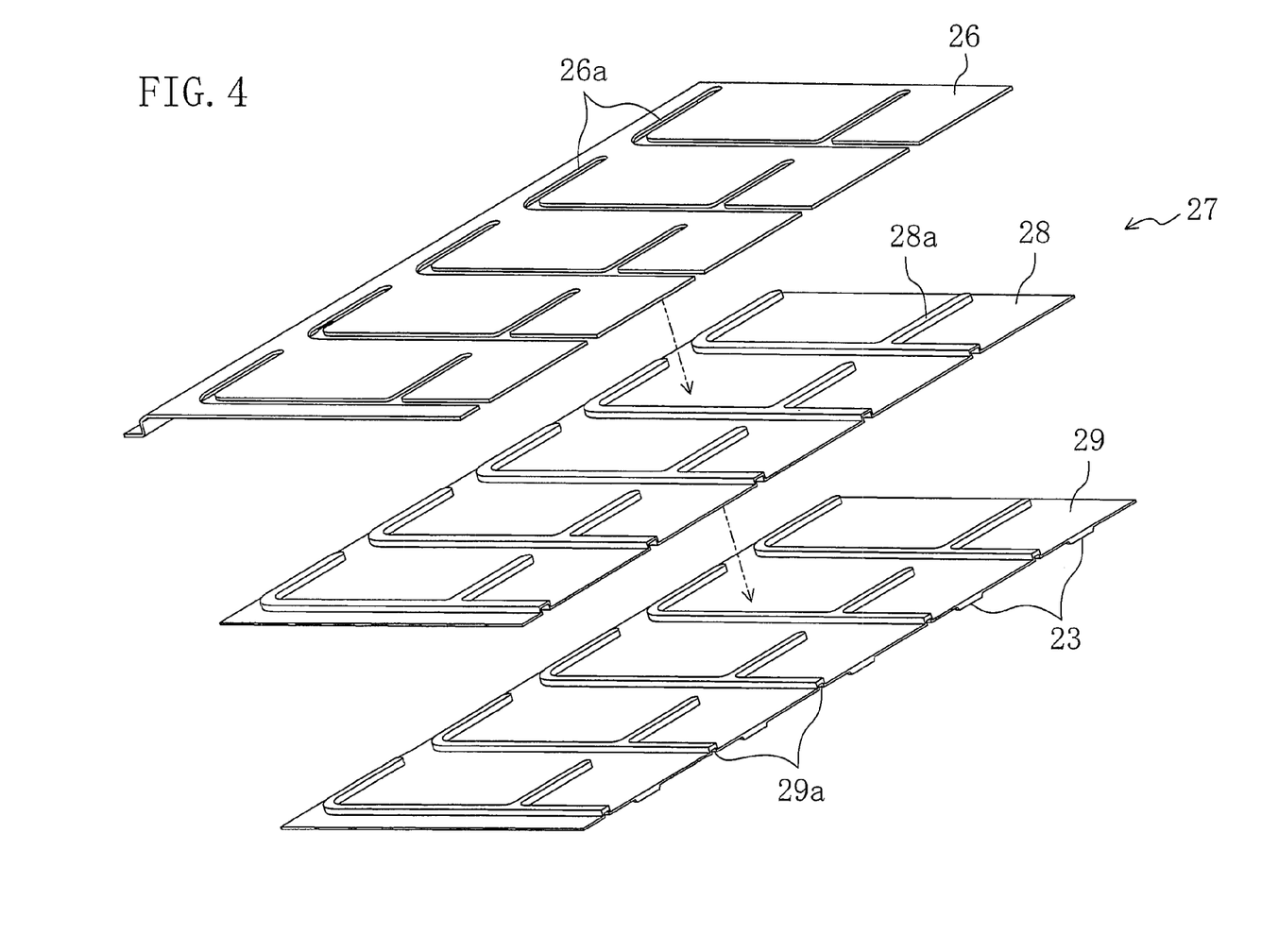
FIG. 4 is an exploded perspective view of a stainless steel sheet assembly.
Figure 5:
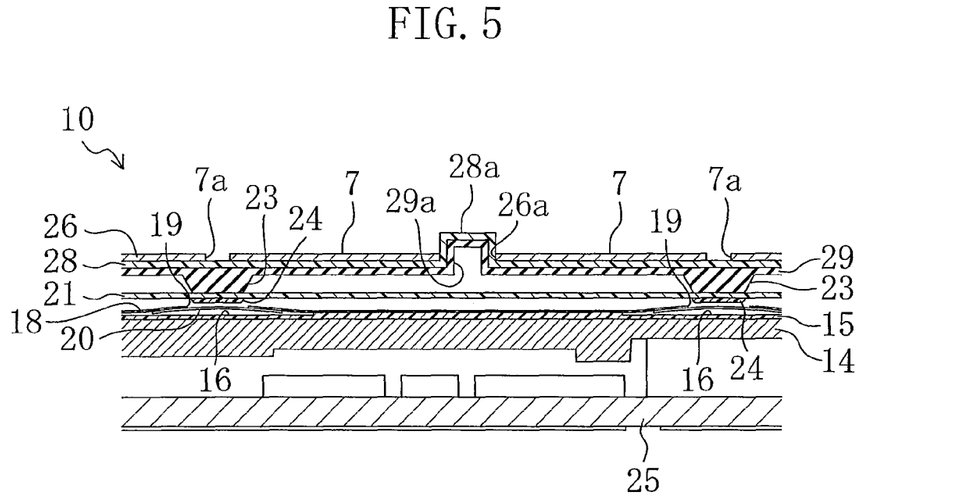
FIG. 5 is an enlarged cross-sectional view taken along line V-V in FIG. 1.

FIG. 3 is an exploded perspective view of the substrate unit. FIG. 4 is an exploded perspective view of a stainless steel sheet assembly. FIG. 5 is an enlarged cross-sectional view taken along line V-V in FIG. 1.

As shown in FIG. 3, the substrate unit 10 includes a stainless steel frame 14 having high rigidity. The stainless steel frame 14 is formed as a rigid frame by drawing and bending a stainless steel plate having a thickness of about 0.2 mm. A main substrate 25 for controlling the mobile phone 1 is disposed on the rear side of the stainless steel frame 14, and a printed board 15 is disposed on the front side of the stainless steel frame 14. A plurality of fixed contacts 16 are provided on the printed circuit board 15, and a lateral terminal 15a of the printed board 15 is connected to the main substrate 25 located on the rear side of the printed board 15. The operation keys 7 are positioned immediately above the fixed contacts 16, respectively. A pair of LEDs 17 as light emitting means are disposed at a lower end of the printed board 15.

As shown also in FIG. 5, a switch sheet 18 is attached to the front side of the printed board 15. This switch sheet 18 is made of, for example, PET (polyethylene terephthalate). Polyethylene terephthalate has also an advantage that white sheets, which are advantageous for improved reflection efficiency, can be easily prepared. Contact openings 19 are formed in the switch sheet 18 at the positions corresponding to the fixed contacts 16. Conductive movable contacts 20 are respectively disposed in the contact openings 19. The conductive movable contacts 20 have a dome shape, and are deformed to be electrically connected to the fixed contacts 16, when pressed from the front side thereof.

A light guide sheet 21 for receiving light from the LEDs 17 and guiding the light to the plurality of operation keys 7 is disposed on the front side of the switch sheet 18. This light guide sheet 21 is made of polycarbonate (PC). Since polycarbonate is highly transparent, polycarbonate tends to guide light from the LEDs 17 to each operation key 7. An adhesive is applied to the periphery of the rear side of the light guide sheet 21. Thus, the light guide sheet 21 is easily attached to the printed board 15.

As shown in FIG. 5, pressing sheets 24 as pressing means are attached to the rear side of the light guide sheet 21 at the positions corresponding to the conductive movable contacts 20 by using an adhesive or the like. The pressing sheets 24 serve to facilitate transmission of the pressing force, transmitted to protruding portions 23 when pressing the operation keys 7, to the conductive movable contacts 20 so that the conductive movable contacts 20 are electrically connected to the fixed contacts 16. The pressing sheets 24 are circular sheets of a material having lower rigidity than that of polycarbonate (e.g., polyethylene terephthalate). By forming the pressing sheets 24 from polyethylene terephthalate having lower rigidity than that of polycarbonate, a soft feel can be obtained when pressing the operation keys 7.

As shown in FIG. 4, a stainless steel sheet assembly 27 is formed by a stainless steel sheet 26, a urethane sheet 28, and a rubber layer 29. For example, in the present embodiment, the stainless steel sheet 26 is made of a stainless steel (SUS304) thin plate having a thickness of 0.15 mm, and the characters 7a of the operation keys 7 and slits 26a are cut out by a photoetching process. Note that, in FIGS. 3 and 4, the characters 7a are omitted for simplification. The photoetching process is a process based on chemical corrosion. Thus, the photoetching process is free from flashes, distortions, burrs, and the like, and high precision products can be produced even from the thin stainless steel sheet 26. The characters 7a of the operation keys 7 can be highlighted by leaking light from the cut-out characters 7a.

The urethane sheet 28 is made of a translucent thermoplastic polyurethane resin (TPU) capable of transmitting light guided by the light guide sheet 21, therethrough. This thermoplastic polyurethane resin is a kind of elastomer, and is characterized by being free from a vulcanization process, being easy to mold, providing a wide range of hardness and elasticity, being easy to color, and the like. The thickness of the urethane sheet 28 is about 0.1 mm. The urethane sheet 28 is attached to the rear surface of the stainless steel sheet 26. The urethane sheet 28 has ridge portions 28a that bulge out through the slits 26a to the front side of the stainless steel sheet 26, where the rear sides of the ridge portions 28a have groove-like openings.

The rubber layer 29 is attached to the rear surface of the urethane sheet 28, and has a plurality of protruding portions 23, protruding toward the main substrate 25, at the positions corresponding to the plurality of fixed contacts 16. Recess grooves 29a as wrong operation preventing means are formed on the rear sides of the ridge portions 28a in the rubber layer 29 by recessing the rear side of the lubber layer 29. The recess groove 29a serves to prevent the operation keys 7, which are located adjacent to each ridge portion 28a, from being depressed at the same time. The rubber layer 29 is formed by pouring a liquid rubber into a mold, and thermocompressing bonding the rubber onto the rear side of the urethane sheet 28. The recess grooves 29a can be easily formed in this manner. The rubber layer 29 is also made of a translucent material capable of transmitting light guided by the light guide sheet 21, therethrough.

[Functions]

As shown in FIG. 5, since the ridge portions 28a of the urethane sheet 28 bulge out through the slits 26a of the stainless steel sheet 26 to a position higher than the surface of the stainless steel sheet 26, the user can tell by the feel which operation key 7 was depressed when touching the operation portion 8 with fingers.

Portions to be highlighted can be selected by printing the urethane sheet 28 in a light-transmitting color or in a non-light-transmitting color as appropriate. For example, the ridge portions 28a can be colored with a non-light-transmitting color, and the character 7a portions can be colored with an optimal light-transmitting color. Since the urethane sheet 28 and the rubber layer 29 are translucent materials, light guided by the light guide sheet 21 can be transmitted through the urethane sheet 28 and the rubber layer 29, whereby the characters 7a of the operation keys 7 can be illuminated with light of a preferred color, and thus, can be highlighted. Since the light guide sheet 21 receives light from the LEDs 17 and guides the light to the plurality of operation keys 7, the operation keys 7 are easily operable even in the dark.

In order to facilitate guiding of light, the light guide sheet 21 has relatively high rigidity and is less likely to be bent. However, when each operation key 7 is pressed, the opening portion of the corresponding recess groove 29a in the rubber layer 29 is preferentially deformed, and the deformation is less likely to propagate toward the operation keys 7 located adjacent to the pressed operation key 7. Moreover, the pressing sheets 24 are pressed by the protruding portions 23 of the lubber layer 29, and the pressing force is concentrated on the conductive movable contacts 20 to electrically connect the conductive movable contacts 20 to the fixed contacts 16. Thus, the usability of the operation keys 7 is not reduced, and the ratio of wrong operation is reduced. Moreover, since no opening need to be formed in the light guide sheet 21 at the positions corresponding to the operation keys 7, non-uniformity of light is not caused by leakage of a large amount of light from the opening portions.

Since the pressing sheets 24 are attached to the rear side of the conductive sheet 21 located on the surfaces of the conductive movable contacts 20, the pressing force generated when depressing the operation keys 7 is concentrated on the pressing sheets 24, and the conductive movable contacts 20 are reliably electrically connected to the fixed contacts 16. Especially, since the pressing sheets 24, having lower rigidity than that of the light guide sheet 21, are attached to the light guide sheet 21 having high rigidity, the pressing sheets 24 perform a cushion function, thereby providing an improved feel when pressing the operation keys 7.

[Effects of the Embodiment]

Thus, according to the mobile phone 1 of the present embodiment, the recess grooves 29a for preventing the operation keys 7 located adjacent to each ridge portion 28a from being depressed at the same time are provided in the rubber layer 29 at the locations corresponding to the rear sides of the ridge portions 28a. This can implement the operation keys 7 that have a nice feel and are less likely to cause wrong operation, while uniformly guiding light from the LEDs 17 to the operation keys 7.

The pressing sheets 24 are attached to the rear side of the light guide sheet 21 at the positions corresponding to the conductive movable contacts 20, so that the pressing force generated when depressing the operation keys 7 is concentrated on the pressing sheets 24, and the conductive movable contacts 20 are electrically connected to the fixed contacts 16. Thus, the operation keys 7 having a nice feel can be provided while uniformly guiding light from the LEDs 17 to the operation keys 7 by a simple structure.

The pressing sheets 24 are made of polyethylene terephthalate having lower rigidity than that of the light guide sheet 21 made of polycarbonate, and are attached to the rear side of the light guide sheet 21 by an adhesive. This enables the pressing sheets 24 to be easily attached to the light guide sheet 21, and provides a soft feel when pressing the operation keys 7, whereby the usability can further be improved.

Since the conductive movable contacts 20 are attached to the rear side of the switch sheet 18 to form a unit, positioning between the conductive movable contacts 20 and the fixed contacts 16 can be performed accurately and reliably. Moreover, since the contact openings 19 are formed in the switch sheet 18, the pressing force of the pressing sheets 24 is easily applied to the central portions of the conductive movable contacts 20, whereby the operation keys 7 having an improved feel can be implemented, and the height of the operation keys 7 can be reduced. Thus, a compact mobile phone 1 having high usability can be obtained.

[First Modification of the Embodiment]

Figure 6:
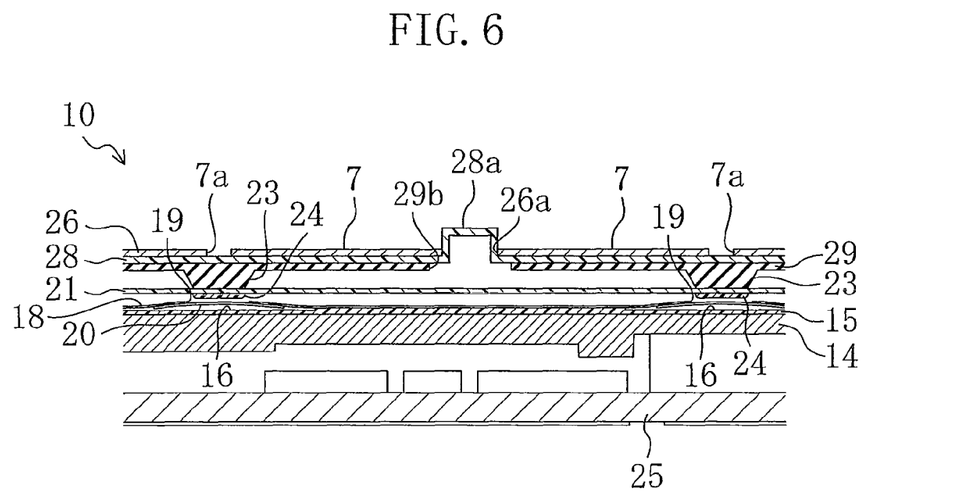
FIG. 6 is a diagram corresponding to FIG. 5, according to a first modification of the embodiment.

In the above embodiment, the recess grooves 29a formed on the rear sides of the ridge portions 28a are used as wrong operation preventing means. However, as shown in FIG. 6, openings 29b formed along the ridge portions 28a may be used as the wrong operation preventing means. In this case, since deformation caused when pressing one operation key 7 is blocked by the opening 29b portion located on the lower surface of the corresponding ridge portion 28a, the influence on the operation keys 7 located adjacent to this operation key 7 is reduced, whereby the ratio of wrong operation can be reduced.

[Second Modification of the Embodiment]

Figure 7:
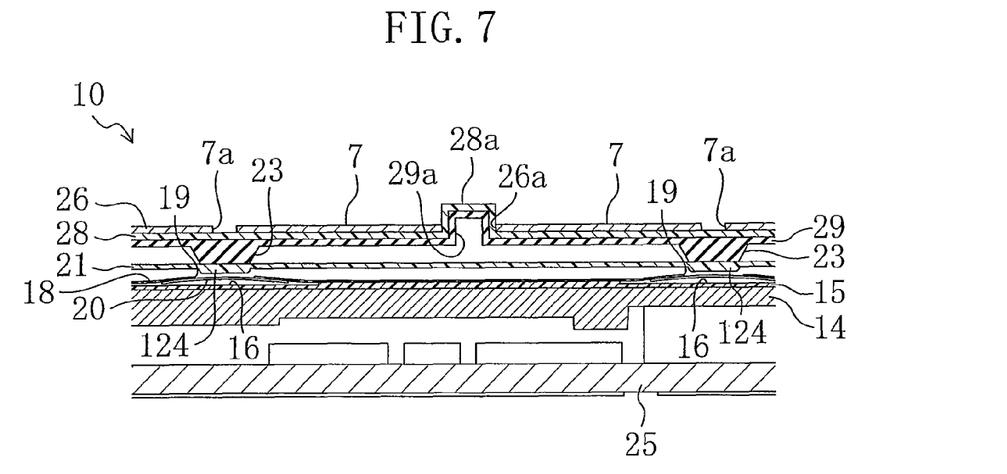
FIG. 7 is a diagram corresponding to FIG. 5, according to a second modification of the embodiment.

In the above embodiment, the pressing means, provided as the pressing sheets 24, is a separate member from the light guide sheet 21. However, as shown in FIG. 7, the pressing means may be formed by pressing protrusions 124 that are formed integrally on the rear side of the light guide sheet 21 at the positions corresponding to the conductive movable contacts 20.

More specifically, the pressing protrusions 124 are formed by applying a UV-curable resin to the light guide sheet 21 at the positions corresponding to the protruding portions 23 of the rubber layer 29, and curing the UV-curable resin by UV radiation.

By forming the pressing protrusions 124 from a material having lower rigidity than that of polycarbonate, a soft feel can be provided when pressing the operation keys 7.

Thus, by forming the pressing protrusions 124 integrally on the rear side of the light guide sheet 21 located on the surfaces of the conductive movable contacts 20, the pressing force generated when depressing the operation keys 7 is concentrated on the pressing protrusions 124, whereby the conductive movable contacts 20 are reliably electrically connected to the fixed contacts 16. Moreover, forming the pressing protrusions 124 integrally on the light guide sheet 21 reduces the number of parts, and thus, the number of assembling steps.

Thus, according to the mobile phone 1 of this modification, the pressing protrusions 124 are formed integrally on the light guide sheet 21 by applying UV light to a UV-curable resin, whereby the pressing protrusions 124 can be formed very easily.

Moreover, the pressing protrusions 124 are integrally provided on the rear side of the light guide sheet 21 at the positions corresponding to the conductive movable contacts 20, so that the pressing force generated when depressing the operation keys 7 is concentrated on the pressing protrusions 124, and the conductive movable contacts 20 are electrically connected to the fixed contacts 16. This can reduce the number of parts, and thus, the number of assembling steps, and can implement the operation keys 7 having a nice feel, while uniformly guiding light from the LEDs 17 to the operation keys 7 by a simple structure.

Note that, in this modification, a UV-curable resin is formed integrally on the light guide sheet 21 by UV radiation. However, polyurethane (PU) may be formed integrally on the light guide sheet 21.

[Third Modification of the Embodiment]

Figure 8:
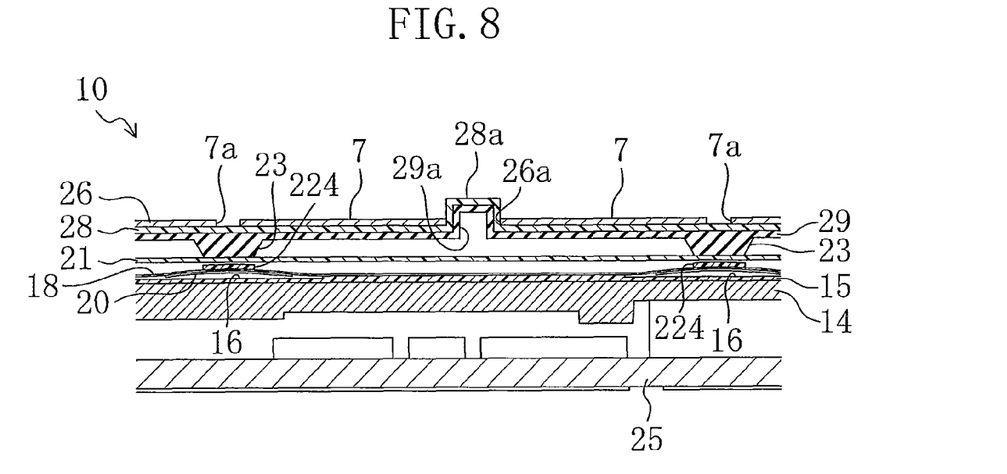
FIG. 8 is a diagram corresponding to FIG. 5, according to a third modification of the embodiment.

In this modification, as shown in FIG. 8, the pressing means are formed by pressing protrusions 224 that are formed integrally on the front side of the switch sheet 18 at the positions corresponding to the conductive movable contacts 20.

Forming the pressing protrusions 224 integrally on the front side of the switch sheet 18 at the positions corresponding to the conductive movable contacts 20 reduces the number of parts, and thus, the number of assembling steps. Moreover, the pressing force generated when depressing the operation keys 7 is concentrated on the pressing protrusions 224, whereby the conductive movable contacts 20 are reliably electrically connected to the fixed contacts 16.

Moreover, the pressing protrusions 224 are formed integrally on the switch sheet 18 located on the surfaces of the conductive movable contacts 20, so that the pressing force generated when depressing the operation keys 7 is concentrated on the pressing protrusions 224, and the conductive movable contacts 20 are electrically connected to the fixed contacts 16. This can reduce the number of parts, and thus, the number of assembling steps, and can implement the operation keys 7 having a nice feel, while uniformly guiding light from the LEDs 17 to the operation keys 7 by a simple structure.

Moreover, since the switch sheet 18 having the pressing protrusions 224 is made of polyethylene terephthalate having lower rigidity than that of polycarbonate, a soft feel can be provided when pressing the operation keys 7.

[Other Embodiments]

The present invention may have the following structures with respect to the above embodiment.

That is, although a portable terminal is the mobile phone 1 in the above embodiment device, the portable terminal may be a PHS (Personal Handyphone System), a PDA (Personal Digital Assistant), a PC (Personal Computer), a mobile tool, an electronic dictionary, an electronic calculator, a copying machine, or the like.

Note that the above embodiments are essentially preferable examples, and are not intended to limit the scope of the present invention, its applications, and its uses.

Industrial Applicability

As described above, the present invention is useful for portable terminals that are operable in the dark by guiding light from light emitting means to operation keys, such as portable communication devices.

The invention claimed is:

1. A portable terminal, comprising:
a substrate having a plurality of fixed contacts provided thereon;
a housing main body covering the substrate from a front surface thereof, and having a key through hole;
a key sheet forming a plurality of operation keys by partitioning the key through hole by slits;
a urethane sheet attached to a rear surface of the key sheet, and having ridge portions that bulge out through the slits to a front side of the key sheet, where rear sides of the ridge portions have groove-like openings;
a rubber layer attached to a rear surface of the urethane sheet, and having a plurality of protruding portions that protrude toward the substrate at positions corresponding to the plurality of fixed contacts;
light emitting means disposed closer to the substrate than the rubber layer is, for emitting light;
a light guide sheet disposed closer to the substrate than the rubber layer is, for receiving light from the light emitting means, and guiding the light to the key sheet;
a plurality of conductive movable contacts disposed closer to the substrate than the light guide sheet is, so as to correspond to the plurality of fixed contacts; and
pressing means that is pressed by the protruding portions to electrically connect the conductive movable contacts to the fixed contacts, when the keys are depressed, wherein
the rubber layer includes wrong operation preventing means disposed at locations corresponding to the rear sides of the ridge portions, for preventing the operation keys located adjacent to each ridge portion from being depressed at the same time, and
the wrong operation preventing means is openings formed along the ridge portions.

2. The portable terminal of claim 1, wherein
the key sheet is made of a stainless steel sheet, and
characters of the operation keys and the slits are cut out from the key sheet by a photoetching process.

3. The portable terminal of claim 2, wherein
the urethane sheet is made of a translucent thermoplastic polyurethane resin capable of transmitting light guided by the light guide sheet, therethrough.

4. The portable terminal of claim 3, wherein
the urethane sheet is colored with a light-transmitting color or a non-light-transmitting color according to the characters and the slits.

5. The portable terminal of claim 1, wherein
the rubber layer is formed by pouring a translucent liquid rubber, capable of transmitting light guided by the light guide sheet, therethrough, into a mold, and then thermocompressing bonding the liquid rubber onto the rear side of the urethane sheet.

6. The portable terminal of claim 1, wherein
the pressing means is formed by pressing sheets that are attached to a rear side of the light guide sheet at positions corresponding to the conductive movable contacts.

7. The portable terminal of claim 6, wherein
the light guide sheet is made of polycarbonate, and
the pressing sheets are formed by applying an adhesive to a material having lower rigidity than that of polycarbonate.

8. The portable terminal of claim 6, wherein
the conductive movable contacts are attached to a rear side of a switch sheet, and
contact openings are formed in the switch sheet at positions corresponding to central portions of the conductive movable contacts.

9. The portable terminal of claim 1, wherein
the pressing means is formed by pressing protrusions that are formed integrally on a rear side of the light guide sheet at positions corresponding to the conductive movable contacts.

10. The portable terminal of claim 9, wherein
the light guide sheet is made of polycarbonate, and
the pressing protrusions are formed by curing an ultraviolet-curable resin.

11. The portable terminal of claim 1, wherein
the conductive movable contacts are attached to a rear side of a switch sheet, and
the pressing means is formed by pressing protrusions that are formed integrally on a front side of the switch sheet at positions corresponding to the conductive movable contacts.

12. The portable terminal of claim 11, wherein
the light guide sheet is made of polycarbonate, and
the switch sheet is made of polyethylene terephthalate.

13. The portable terminal of claim 1, wherein
the portable terminal is a mobile phone.

14. A portable terminal, comprising:
a substrate having a plurality of fixed contacts provided thereon;
a housing main body covering the substrate from a front surface thereof, and having a key through hole;
a key sheet forming a plurality of operation keys by partitioning the key through hole by slits;
a urethane sheet attached to a rear surface of the key sheet, and having ridge portions that bulge out through the slits to a front side of the key sheet, where rear sides of the ridge portions have groove-like openings;
a rubber layer attached to a rear surface of the urethane sheet, and having a plurality of protruding portions that protrude toward the substrate at positions corresponding to the plurality of fixed contacts;
light emitting means disposed closer to the substrate than the rubber layer is, for emitting light;
a light guide sheet disposed closer to the substrate than the rubber layer is, for receiving light from the light emitting means, and guiding the light to the key sheet;
a plurality of conductive movable contacts disposed closer to the substrate than the light guide sheet is, so as to correspond to the plurality of fixed contacts; and
pressing means that is pressed by the protruding portions to electrically connect the conductive movable contacts to the fixed contacts, when the keys are depressed, wherein
the rubber layer includes wrong operation preventing means disposed at locations corresponding to the rear sides of the ridge portions, for preventing the operation keys located adjacent to each ridge portion from being depressed at the same time, and
the wrong operation preventing means is recess grooves formed on the rear sides of the ridge portions by recessing a rear side of the rubber layer.

* * * * *